United States Patent

[11] 3,610,201

[72] Inventor Alfred L. Meyer
 Wood Dale, Ill.
[21] Appl. No. 817,684
[22] Filed Apr. 21, 1969
[45] Patented Oct. 5, 1971
[73] Assignee Anetsberger Brothers, Inc.

[54] VISCOUS MATERIAL SPREADER
 5 Claims, 3 Drawing Figs.
[52] U.S. Cl. .................................................. 118/24,
 118/324, 118/410
[51] Int. Cl. ..................................................... B05c 5/00
[50] Field of Search............................................ 118/324,
 410, 24, 25, 300.6, 325, 411; 18/12 C, 12M

[56] References Cited
 UNITED STATES PATENTS
2,734,224 2/1956 Winstead...................... 118/410 X
3,120,676 2/1964 Ballantyne.................... 401/282 X
3,333,567 8/1967 Rich et al..................... 118/410 X
2,307,858 1/1943 Rufo............................ 15/Floor Treat
 FOREIGN PATENTS
500,324 11/1954 Italy ............................ 118/300.6

Primary Examiner—John P. McIntosh
Attorney—Davis, Lucas, Brewer & Brugman

ABSTRACT: Device for spreading butter or other viscous material uniformly across full width of dough sheet on belt conveyor, comprising a base removably mounted above conveyor with elongate, centrally disposed and laterally extending delivery slot therethrough, a casing removably attachable at lower end to the base and having an inlet at upper end, a labyrinth removably supported on the base within the casing, whereby removal of casing, labyrinth and base may readily be effected to facilitate cleaning the labyrinth being formed by a plurality of horizontal plates extending the full interior lateral length of the casing and spaced vertically from each other, with two apertures through the transverse centerline of the uppermost plate spaced on opposite sides of the inlet on centers one-fourth of the length of the plate from its ends, four slots spaced one-fourth the length of the plate from each other along both front and rear edges of the next lowermost or second plate, and eight apertures through transverse centerline of third plate spaced one-eighth the length of the plate from each other to provide uniform misaligned lateral spacing of all apertures and slots in the three upper plates, and a bottom plate narrower than the casing to insure equal distribution of material along doubly reversed paths between the center and the front and rear walls of the casing and successive plates from inlet to delivery slot, and a metering plate slidably mounted on the base for selective manual adjustment horizontally relative to the delivery slot to determine the rate of delivery of material therefrom.

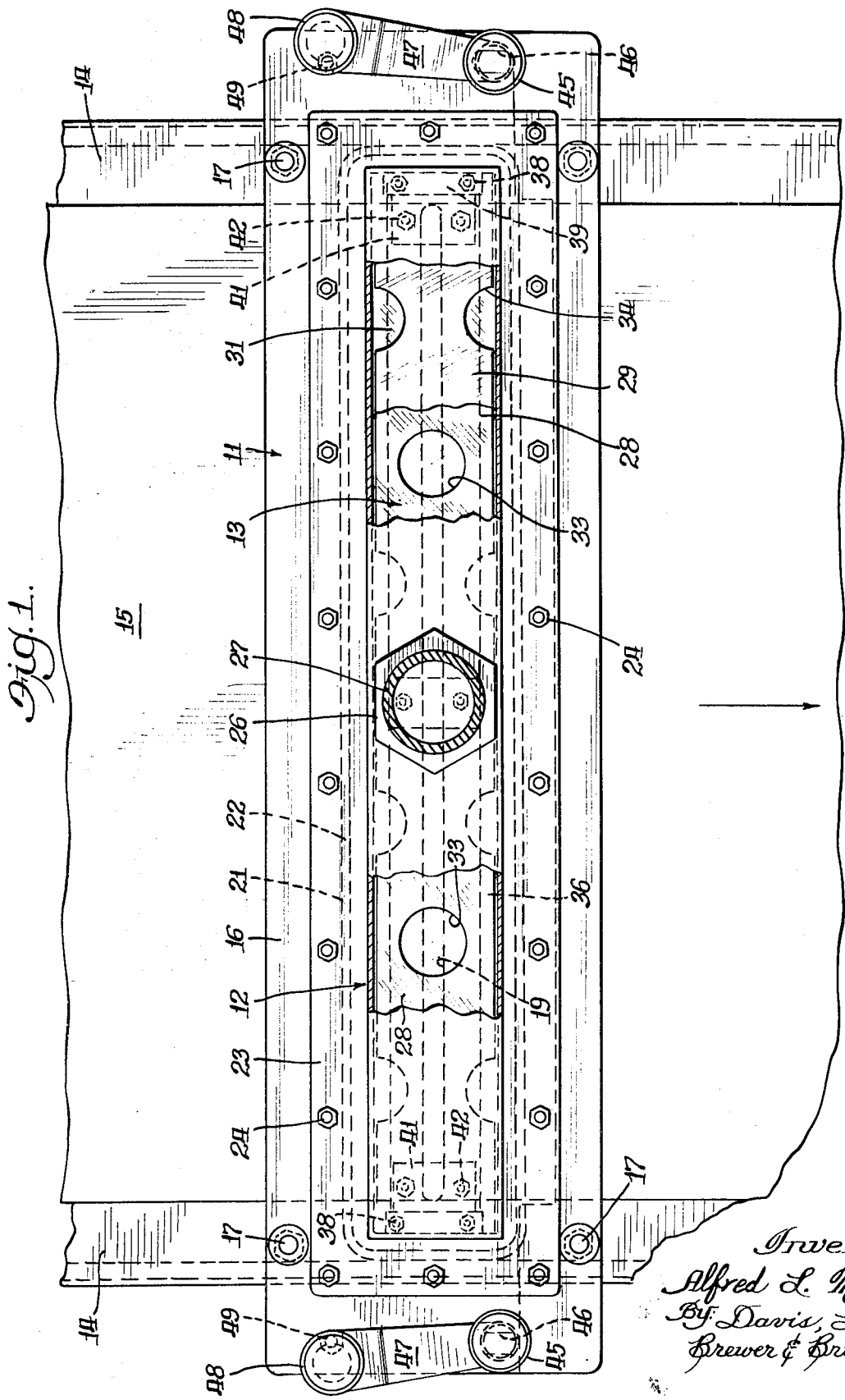

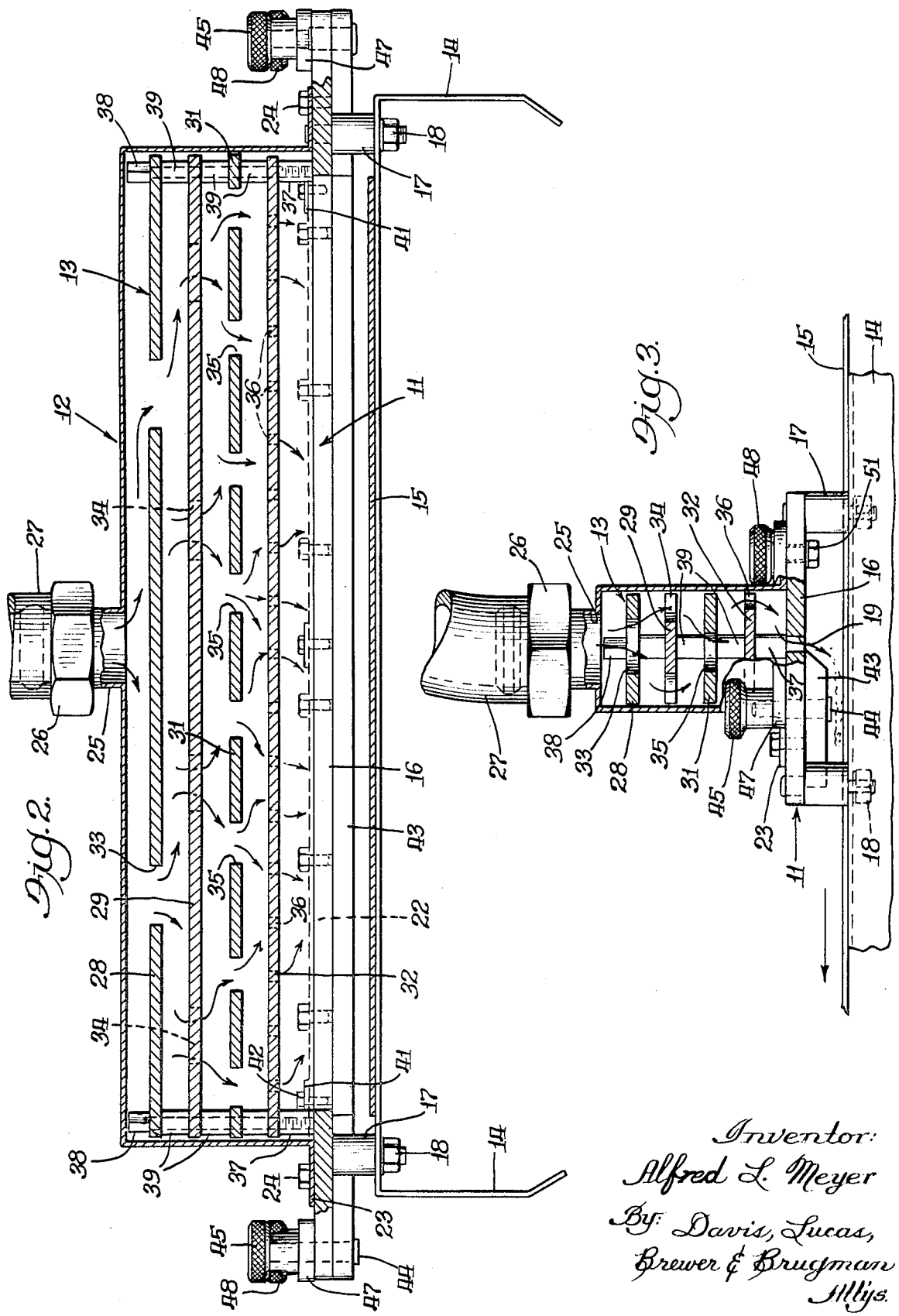

VISCOUS MATERIAL SPREADER

BACKGROUND OF THE INVENTION

1. Field of the Invention

This invention relates generally to production bakery equipment, and more particularly to means for automatically spreading butter or other viscous material uniformly over a sheet of dough moved therepast on a belt conveyor.

2. Description of the Prior Art

Manifolds heretofore employed for spreading butter or other viscous materials as a layer on a relatively wide strip of dough moving therepast have not produced completely uniform results and have been extremely difficult to clean, and in order to prevent contamination in subsequent runs resulting from clogging, spoilage or rancidity, it is essential that such equipment be thoroughly cleaned after each production run or, at least, daily.

SUMMARY OF THE INVENTION

This invention overcomes both of these difficulties by providing a spreader for delivering a uniform layer of butter or other viscous material over the full width of a sheet of dough moved therepast on a conveyor, which comprises a base having an elongate and laterally extending delivery slot extending therethrough removably mounted above the conveyor, a casing removably attachable at its lower end to the base and having an inlet for receiving the viscous material under pressure at its upper end, and a labyrinth removably supported on the base within the casing between the inlet and the delivery slot, whereby all parts may readily be removed to facilitate cleaning. The invention also includes manually adjustable means for selectively varying the effective width of the delivery slot to determine the rate of delivery of material therefrom.

In the drawings:

FIG. 1 is a plan view of a viscous material spreader embodying the invention mounted on the side frame members of a belt conveyor, with parts shown in horizontal section and parts broken away to better illustrate the labyrinth;

FIG. 2 is a front view, as seen from the bottom of FIG. 1, with most of the parts in vertical section along the transverse centerline of the spreader; and FIG. 3 is an end view, as seen from the right side of FIGS. 1 and 2, with parts broken away and shown in vertical section.

DESCRIPTION OF THE PREFERRED EMBODIMENT

Referring more particularly to the drawings, a viscous material spreader embodying the features of this invention is therein disclosed as comprising a base, a casing and a labyrinth, which are indicated generally, respectively, by reference numerals 11, 12 and 13. These several parts of the spreader are readily separable from each other and are mounted as a unit on longitudinal frame members 14 supporting in well-known manner an endless belt conveyor 15. As best seen in FIGS. 2 and 3, the base 11 comprises a horizontally disposed manifold plate 16 suitably apertured to slidably receive the upper reduced end portions of four mounting posts 17 (FIG. 1), with the lower reduced and threaded end portions of these posts 17 extending through suitable apertures in the frame members 14 and secured to the latter by means of nuts 18 (FIGS. 2 and 3). With this arrangement, the manifold plate 16 and the other parts of the instant spreader supported thereby may readily be lifted upwardly relative to the mounting posts 17 for removal from the dough-working mechanism of which the frame members 14 and conveyor 15 form a part.

As best seen in FIGS. 1 and 3, the manifold plate 16 of the base 11 includes an elongate and laterally extending delivery slot 19 which extends therethrough on the transverse centerline of the plate for substantially the full width of the belt conveyor 15. The upper surface of the plate 16 is provided with a groove 21 which, as shown in FIG. 1, defines the periphery of a rectangle in plan having rounded corners. This groove 21 receives an O-ring 22 which functions as a seal between the manifold plate 16 and the casing 12.

The casing 12 is in the form of an inverted hollow rectangle and is provided with a horizontal marginal flange 23 at its lower end engaging with the O-ring 22 and removably secured to the upper surface of the manifold plate 16 by a plurality of cap screws 24. Centrally of its upper wall, the casing 12 is provided with a flanged inlet 25 which is secured in well-known manner by a union 26 to the end of a feed conduit 27 supplying butter or other viscous material under pressure. The means for imposing such pressure upon the viscous material and delivering the same through the conduit 27 are not illustrated because they do not form a specific part of this invention. Any suitable means for this purpose may be employed.

Disposed within the casing 12 between this inlet 25 and the manifold plate 16 is the labyrinth 13 previously noted which comprises a plurality of horizontally disposed plated 28, 29, 31 and 32 that are substantially the same length as the interior lateral dimension of the casing 12, with the uppermost three 28, 29 and 31 also being of substantially the same width as the interior of casing 12. The first or uppermost plate 28 is provided with two apertures 33 through the centerline of the plate and spaced on opposite sides of the inlet 25 on centers one-fourth of the length of the plate from its ends. This location and spacing of the uppermost apertures 28 will perhaps best be appreciated from the showing in FIG. 2. The next lowermost or second plate 29 is provided with four slots 34 therethrough which are spaced one-fourth of the length of the plate from each other along both front and rear edges thereof. The next lowermost or third plate 31 is provided along its transverse centerline with eight apertures 35 the centers of which are spaced one-eighth of the length of the plate from each other, with the centers of the two outermost being disposed one-sixteenth of the length of the plate from its ends. It will thus be seen, particularly from FIG. 2, that these apertures 33 and 35 and the slots 34 in the top three plates 28, 29 and 31 are uniformly misaligned laterally which ensures uniform lateral distribution of the viscous material introduced into the casing 12 through the inlet 25 over the full width of the casing. The fourth or lowermost plate 32, as best seen in FIG. 3, is narrower than the interior of the casing 12 to provide marginal slots or laterally extending orifices 36 between each longitudinal edge of this plate and the adjacent front and rear wall of the casing 12. With this arrangement and the disposition of the apertures 33 and 35 and the slots 34 previously described, equal distribution of the viscous material from the inlet 25 to the delivery slot 19 in the manifold plate 16 will be assured by being directed along doubly reversed paths between the center and the front and rear walls of the casing 11 and the several plates 28, 29, 31 and 32. Such paths are best seen in FIG. 3 and are indicated therein by the downwardly directed arrows. While the above-described spacing and arrangement of the apertures and slots 33–36 is important to ensure uniform distribution of the viscous material from the casing inlet 25 to the full length of the delivery slot 19 in the base or manifold plate 16, it also is important that the total areas of such apertures or slots in any one of the plates 28, 29, 31 or 32 not be less than that of the next adjacent uppermost plate or of the inlet 25. Expressed somewhat differently, each of these plates making up the labyrinth 13 and its imperforate area defines vertical pathways therepast separated by the imperforate area, and it is important that the total imperforate area of each successively lower plate be less than that of the next preceding plate above it.

The labyrinth 13 as a whole, comprising these plates 28, 29, 31 and 32, is removably mounted upon and supported by the upper surface of the manifold plate 16 by means of a pair of lower spacers 37 below each end of the bottom plate 32 and a pair of bolts 38 threadedly engaging at their lower ends in suitably tapped apertures in each of these spacers 37. Interposed between adjacent ends of each of these plates and slidably mounted on the shanks of each pair of bolts 38 are three intermediate spacers 39. In assembling these several parts of the labyrinth 13 to provide a unitary structure, the four bolts 38 are first dropped through suitable apertures in the upper plate 28, an intermediate spacer 39 is then slid onto each pair of bolts, the three remaining plates similarly are successively mounted on the bolts with intermediate spacers 39, and the lower ends of the bolts are screwed into the tapped apertures provided in the lower spacers 37.

To facilitate proper positioning of the assembled labyrinth 13 on the manifold plate 16, the latter may be provided with a pair of stop plates 41 (FIGS. 1 and 2) having depending tongues engageable in the ends of the transverse delivery slot 19 and secured to the plate 16 by suitable cap screws 42. With this arrangement, the stop plates 41 will engage the inner vertical surfaces of the lower spacers 37 when the labyrinth is placed in proper position on the upper surface of the manifold plate. As best seen in FIGS. 2 and 3, the casing 12 may then be placed over the labyrinth and onto the sealing O-ring 22 and secured by the cap screws 24 to the manifold plate 16 to provide a leakproof connection therewith.

Means also are provided for selectively varying the effective width of the delivery slot 19 in the manifold plate 16 which comprises a manually adjustable metering plate 43 slidably mounted on the undersurface of the base or manifold plate 16 for horizontal movement relative thereto. As best seen in FIGS. 2 and 3, this metering plate 43 is suspended from and secured to the base or manifold plate 16 by means of a stud 44 extending upwardly through a suitable aperture adjacent each end of the plate 43 and threaded at its upper end for engagement with a tapped aperture in a locking knob 45, each stud 44 also extending through an elongated aperture 46 (FIG. 1) in the manifold plate 16. With this arrangement, the two studs 44 and locking knobs 45 comprise bolt-and-nut means or securing the metering plate 43 in desired position on the manifold plate 16. Each of these studs 44 also extends through a suitable circular aperture in one end of a link 47 interposed between the plate 16 and the associated knob 45. As best seen in FIG. 1, the other end of each link 47 is provided with another circular aperture for rotatably receiving a circular flange comprising the intermediate portion of an eccentric 48, the lower end of which comprises a smaller depending post 49 which is offset from the center of the flange and is tapped to receive the upper threaded end of the cap screw 51 (FIG. 2) extending upwardly through a suitable aperture in the manifold plate 16. With this arrangement, loosening of the two cap screws 51 will permit manual rotation of the eccentrics 48 about the centers of their pivot posts 49 to move the links 47 longitudinally. Such movement will be permitted, of course, only if the locking knobs 45 first are turned to release the metering plate 43 for movement relative to the base or manifold plate 16, and it will be limited by the elongated apertures 46 in the base. This will enable the rear edge of the metering plate 43, which preferably is chamfered as shown in FIG. 3, to be displaced relative to the delivery slot 19 to selectively determine the effective area of that slot and the rate of delivery of the viscous material therefrom. Since a dough sheet on the belt conveyor 15 is being moved past the delivery slot 19, as in the direction of the straight arrows in FIGS. 1 and 3, this will result in spreading a layer of the viscous material thereon, the thickness of which may thus be varied as desired.

What is claimed is:

1. A spreader for viscous material, comprising a base having an elongate and laterally extending delivery slot therethrough for depositing the viscous material, a casing removably attachable at its lower end to said base and having an inlet at its upper end for receiving the viscous material under pressure, and a labyrinth disposed within said casing between said inlet and said delivery slot for directing the flow of viscous material therethrough to distribute the same to said delivery slot uniformly over its full length, wherein said labyrinth comprises a plurality of horizontal plates extending the full interior lateral length of said casing and spaced vertically from each other.

2. A spreader according to claim 1, wherein each said horizontal plate defines vertical pathways therepast separated by imperforate areas and the total imperforate area of each successively lower plate is less than that of the next preceding plate above it.

3. A spreader according to claim 2, wherein said vertical pathways defined by each said plate are spaced in a front-to-rear direction relative to those defined by the plates adjacent thereto.

4. A spreader according to claim 3, wherein said vertical pathways defined by the uppermost said horizontal plate are spaced laterally relative to said casing inlet.

5. A spreader according to claim 4, wherein said vertical pathways defined by the next two of said plates below said uppermost plate are successively spaced laterally relative to each other and to those of said uppermost plate.